United States Patent [19]
Bolt

[11] Patent Number: 4,954,921
[45] Date of Patent: Sep. 4, 1990

[54] MAGNETIC TRANSDUCER HEAD STRUCTURE WITH REDUCED LEAKAGE BETWEEN CORE CIRCUITS

[75] Inventor: Michael L. Bolt, Ann Arbor, Mich.

[73] Assignee: Irwin Magnetic Systems, Inc., Ann Arbor, Mich.

[21] Appl. No.: 241,090

[22] Filed: Sep. 6, 1988

Related U.S. Application Data

[63] Continuation of Ser. No. 915,734, Oct. 6, 1986, Pat. No. 4,819,107, which is a continuation-in-part of Ser. No. 645,436, Aug. 29, 1984, abandoned.

[51] Int. Cl.$^5$ ............................................. G11B 5/265
[52] U.S. Cl. ................................................... 360/121
[58] Field of Search ................ 360/121, 118, 125, 126

[56] References Cited

U.S. PATENT DOCUMENTS 3,353,168  11/1967  Poumakis ........................... 360/121
4,085,429   4/1978  Hasegawa ....................... 360/121 X

*Primary Examiner*—A. J. Heinz
*Attorney, Agent, or Firm*—Price, Heneveld, Cooper, DeWitt & Litton

[57] ABSTRACT

A magnetic core structure for a "read-write" transducer head of the type known as a "wide-write, narrow-read" head, having at least one magnetic gap, wherein the magnetic pole structure performing one of the transducing functions (e.g. the "write" function) is in effect wider than that performing the other (e.g. the "read") function. At least one such magnetic pole has a laminar structure comprising at least one medial layer or strata and at least one flanking layer or strata which is disposed adjacent to and overlying at least portions of the medial strata, to thereby define an included area of overlap therebetween. The thickness of the medial strata, measured along the length of the gap, is less than that of the magnetic core structure on the opposing side of the gap. At least one non-magnetic isolation member is disposed between the flanking strata and the medial strata, the flanking strata, comprising a magnetic material, being disposed in magnetic communication with the medial strata, to thereby magnetically shunt portions of the medial strata. The included area of overlap between the medial strata and the flanking strata is particularly configured so as to limit the transfer of magnetic flux between the flanking strata and the medial strata across the isolation members at the included area to less than about ten percent of the total magnetic flux in the magnetic circuit.

9 Claims, 1 Drawing Sheet

MAGNETIC TRANSDUCER HEAD STRUCTURE WITH REDUCED LEAKAGE BETWEEN CORE CIRCUITS

CROSS REFERENCE TO RELATED APPLICATIONS

This is a continuation of co-pending application Ser. No. 915,734 filed on Oct. 6, 1986 now U.S. Pat. No. 4,819,107 which is a continuation-in-part of Ser. No. 645,436 now abandoned.

TECHNICAL FIELD

This invention relates generally to the field of magnetic recording, and more particularly to transducer structures used for magnetic recording and reproducing ("read/write") operations. Still more particularly, the invention relates to magnetic transducer core structures which are particularly useful in digital data-storage devices, especially (but not exclusively) tape recorder devices ("tape drives") of the type used in such applications.

BACKGROUND OF THE INVENTION

Most data storage and retrieval is done by use of magnetic recording apparatus, mainly disc drives and tape drives (the term "drive" having come to be accepted as the basic industry designator for recorder/reproducer devices). In the case of disc drives, there are both "hard" disc and "floppy" disc-type media, the "hard" disc being a rigid platter having a magnetizable surface upon which magnetic flux transitions are recorded by means of a transducer head which aerodynamically "flies" with respect to the surface of the disc, being spaced therefrom by a thin film of air. "Floppy" disc drives utilize magnetically recordable media which although disc-like in shape is much more in the nature of magnetic tape, being highly flexible and typically comprising a sheet of polymeric material carrying a surface coating of magnetizable metal oxide. In floppy disc drives, as in tape drives, recording is accomplished by maintaining direct contact between the moving media and the recording head, usually by projecting the tIp of the head (at the magnetic "gap") into the plane of the flexible media as it moves past the head.

Tape drives typically, or at least frequently, feature bi-directional recording and reproducing operation in which the tape is transported along its length from one end to the other during a first read or write operation and then transported back in the opposite direction for the next such operation, without rewinding the tape between the two successive recording operations as would usually be done in tape recording. This bi-directional operation is not characteristic in disc drives (whether "floppy" or "hard" disc media is involved), in which the disc-form media is continuously rotated in the same direction and all recording or reproduction on the media is done unidirectionally.

This rather fundamental difference in operational modes creates a corresponding fundamental difference in the nature of the transducers or heads which may be utilized. In the case of bi-directional reading and writing, a multi-gap head is used, but in the case of unidirectional recording only a single-gap head is necessary, which is much less expensive than a multi-gap head but has the disadvantage of only being able to read and write at different times; i.e., it cannot write and simultaneously read data, as is frequently desirable and is often provided for in tape drives.

Furthermore, in order to maximize the likelihood that the read gap will be properly positioned directly over the written track on the media, two essentially opposite approaches have come to be recognized in the art with respect to the multi-gap heads used in tape drives. The first of these involves use of a write gap which is substantially wider than the read gap, such that if the read gap is nominally positioned anywhere near the center of a written track, the head is likely to be fully in registration with the track, i.e., recorded transitions extending across the entire height, i.e. length, of the gap. The second such approach involves use of a head having a separate erase gap disposed ahead of the write gap, so that the media is erased cleanly before each writing operation takes place; thus, the writing is always accomplished on media having no residual signals. In this arrangement, a read gap is used which is considerably wider than the written track, so that the entire width of the written track is always likely to be completely straddled by the read gap. Since the separate erase gap eliminates all residual or extraneous signals recorded contiguous to the narrower written track, interference, crosstalk and the like will not be present in the read data stream.

Since the approaches just described can only be accomplished with multi-gap heads, they are not utilized in floppy disc drives, where only single-gap read/write heads are used. In order to provide a system somewhat analogous to the second arrangement described above, floppy disc drives frequently utilize a "tunnel erase" concept, in which separate erase gaps are provided on both sides of, and to the rear of, the single read/write gap. The function of the two such erase gaps is to "trim" the marginal edges of the written data track by erasing along both sides thereof, thus producing a resultant narrowed track of written data, the sides of which have no residual or extraneous recorded transitions. In this arrangement, the head structure is somewhat complex since it is necessary to space the erase gaps rearwardly of the read/write gap in order to eliminate or minimize both mechanical and magnetic interference problems, and of course there is the added requirement and expense of providing, and assembling, two separate erase gaps.

The tunnel-erase concept just described is not advantageous in bi-directional recording operations, since bi-directional use of that type of head would inherently necessitate the addition of another pair of erase gaps, spaced on the opposite side of the single read/write gap from the location of the first such set of erase gaps, in order to accommodate both of the possible mutually-opposite recording directions. The realities of manufacturing such a head do not favor its potential use, since the required accurate alignment of the various erase gaps with respect to themselves and with respect to the single read/write gap results in a different manufacturing process which inevitably adds substantial expense. Of course, there is also additional expense involved in the requirement of the second pair of erase gaps, in and of themselves.

In an effort to provide a solution for the difficulties and problems discussed above, it has heretofore been proposed to use a different form of core structure for such transducer heads, which in effect provides operational characteristics functionally representative of those typically found in multi-gap heads, while nonetheless having in fact only a single read/write gap.

More particularly, it has been proposed in the past, to use a transducer head whose magnetic core structure has a full-width write core disposed on one side of the gap and a partial-width read core on the opposite side of the gap. In this structure, special additional magnetic closure or return pieces are disposed on opposite sides of the comparatively narrow read core at the gap, to in effect fill the space created by narrowing the read core. These additional components serve as part of the write core structure during write procedures but are not intended to contribute to the read core output signal appearing on a sense coil accessing only the read core. For examples of such transducer core structures, reference is made to Japanese Patent Publication Nos. 50-111817 (Pat. No. 5235618) and 58-171710 (Patent Abstracts Vol. 8, No. 10, P. 248), as well as U.S. Pat. No. 4,085,429.

The last-mentioned of the above disclosures discusses the overriding importance of obtaining the most favorable signal-to-noise ratios possible in using such special-purpose transducers, and of isolating the read channel from the write channel therein, and this prior patent is predicated upon the use of certain allegedly critical limitations for the thickness, with respect to the magnetic gap, of isolation layers proposed for use between the narrowed read core and the special additional write core closures disposed on opposite sides of the read core.

Notwithstanding the factors just noted, the prior efforts of others in the field have until now failed to appreciate and take into consideration certain other highly significant factors involved in the design considerations for the special-purpose transducer-head core structure involved, and the present invention is based upon, and provides, recognition and disclosure of these important factors. Thus, the present invention provides new and valuable structural features and arrangements for such a core structure, involving improvements which are of such importance where high-density recording is involved as to ultimately make the difference between successful and unsuccessful operation, bearing in mind the underlying requirement that in actual operation such a device must be substantially free from spurious error and consistently reliable in performance.

Accordingly, the present invention provides structural improvements and design criteria for "wide-write, narrow-read" magnetic transducer core structures, which improvements make high-density recording operation possible with attendant low error rates. Broadly speaking, the invention provides important structural and size relationships in the elements comprising the magnetic core; more particularly, the invention provides certain critical size relationships in the area of overlap between the read core and the special write core closures which, when carried through in the incorporation of isolation components (laminar elements, at times referred to as "strata"), provide the consumately desirable operational results just noted.

The foregoing generalized features of the invention will become more apparent following due consideration of the ensuing specification and the appended drawings, in which a preferred embodiment is disclosed to illustrate the underlying concepts and the overall aspect of the invention.

DESCRIPTION OF PREFERRED EMBODIMENTS

Figure 1:
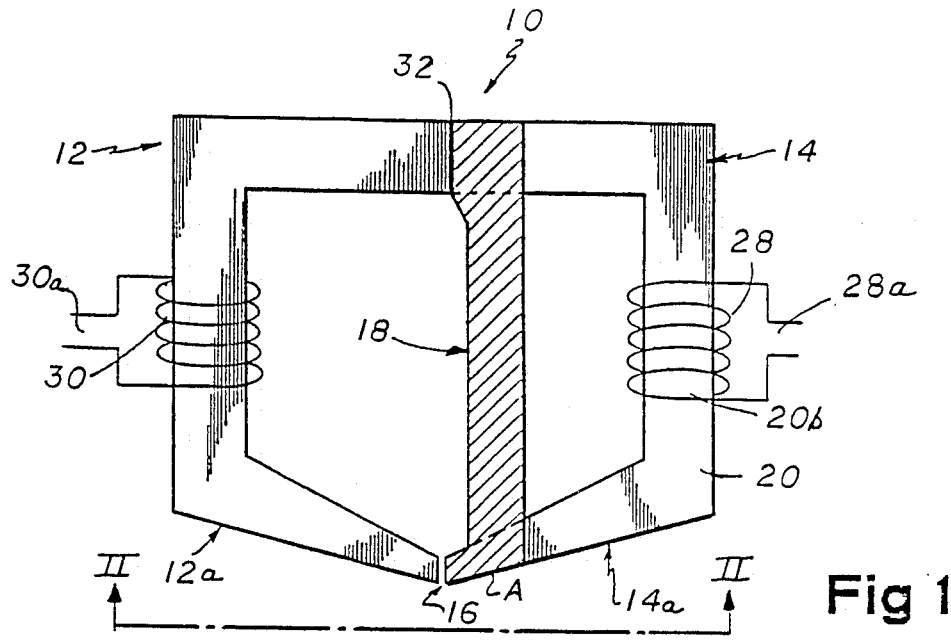
FIG. 1 is a sectionalized overhead plan view of a transducer head core structure in accordance with the invention, taken along the plane I—I of FIG. 2.
Figure 2:
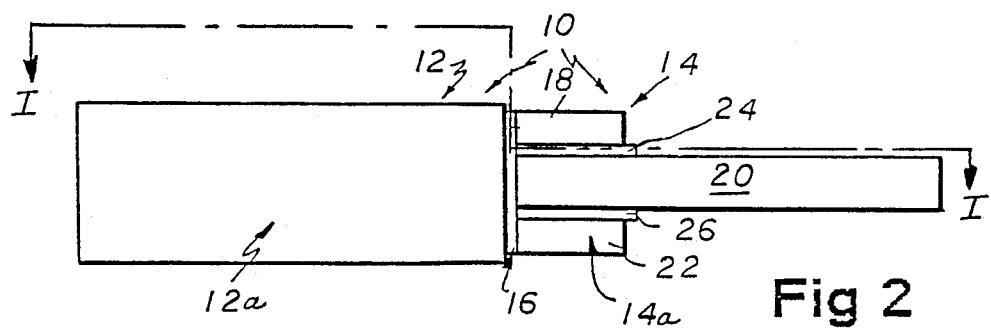
FIG. 2 is an enlarged, bottom view of the structure of FIG. 1.

Referring now in more detail to the drawings, FIGS. 1 and 2 show the overall nature of a transducer head core structure 10 in accordance herewith. As illustrated in these Figures, the core structure 10 includes differently-structured parts (essentially halves) 12 and 14. Considering the half or portion 12 of the core structure as being the "write" portion, it will be seen that this half of the core, shown at the left of the transducing gap 16, constitutes a single pole member whose height is the full height of the gap.

The portion 14 of the core structure 10, appearing at the right side of the transducing gap 16, is not a single monolithic structure like the portion 12, but is instead composite in form, including (in this particular embodiment) three different component parts disposed in stratified or laminar form, designated 18, 20 and 22 respectively. Of these, the two outermost (side) members (sometimes referred to herein as "flanking strata") 18 and 22 comprise closures (returns) for the write core, whereas the central or medial strata 20 comprises the read core.

As discussed more fully below, it is extremely important for each of the three core elements, or strata, 18, 20 and 22 to be separated, i.e. magnetically isolated, from one another. For this reason, non-magnetic isolation members 24 and 26 are disposed between and preferably extend at least slightly beyond the boundaries of the write closures 18 and 22, as illustrated in FIG. 2, the read core 20 extending substantially beyond the isolation layers.

With reference to FIG. 1, it will be seen that the core structure 10 may be generally C-shaped in its overall configuration forming the recording gap 16 at the opening between two converging face portions 12a and 14a which basically define what is commonly referred to as the "cutback angle." Bearing in mind the relative height of the different strata shown in FIG. 2, it will be seen from FIG. 1 that the main write core 12 extends rearwardly from face portion 12a, has an electrical excitation or drive winding (a "write coil") 30 wound about an intermediate portion of it, and extends back toward and into contact (or other magnetic communication) with the other half of the overall core structure at a boundary or junction 32. At this rearward location, the three core elements 18, 20 and 22 located on the opposite side of junction 22 have essentially the same height relationship as they do at the transducing gap 16, and thus together correspond to the full height of the write core 12.

The upper and lower strata 18 and 22, i.e., the write closures, extend rearwardly from the transducing gap 16 in a much more direct manner than is true of the inner or medial read core strata 20, which has configuration in plan which is essentially a mirror-image to that of the write core portion 12 described above (FIG. 1).

Also, the read core medial strata 20 has an electromagnetic coil 28 wound about an intermediate portion 20b, which in accordance with the embodiment under discussion constitutes a read sense coil.

With regard to particular structural materials, the read and write cores 12 and 20 and the write closures 18 and 22 may in general be of any conventional magnetic material customarily used in transducer cores, i.e., "mu metal", ferrite, etc. The various components ("strata") constituting the different core elements may each comprise a "stack" of thin sheet-like laminae, as is often done to reduce eddy current effects, but this is not really essential in transducer cores generally, particularly where (as here) the intended application is to write and read relatively narrow and closely-spaced tracks of magnetic transitions. As will be understood, the isolation layers or elements 24 and 26 are to be of non-magnetic material, e.g. copper or brass, etc. Where the intended media is in the form of magnetic tape, the overall height of the head is preferably many times greater than the mere height of the magnetic core structure itself, and generally equals or exceeds the total width of the tape since the latter must slide lengthwise across the convex (and often curved) front face of the head during transducing operations and the tape should be supported by the head across its entire width. The opposite is generally true in floppy disc transducing procedures, wherein the pole pieces defining the gap typically form a rounded, bluntly conical projection which deforms the recording media into a complementary dimple as the media moves over the gap during recording. As already indicated above, the core structure of the present invention may be embodied in a head of that nature also, by merely using appropriate shape relationships and incorporating the basic structural attributes and concepts set forth herein.

As will be understood, since the preferred embodiment in accordance herewith refers to a transducer head for use with tape media, the overall height of the transducer head should be much higher than the mere height of a single-track core structure, such as is shown in FIG. 2, the general physical structure of the head (apart from the core) being structured according to known head-building techniques, in accordance with which a mounting block of non-magnetic material (e.g., brass) of the desired physical size for the overall head is used to mount the magnetic core components. Usually, such a mounting block takes the form of two complementary halves, which are joined together around the outside of the core structure, interstitial spaces being filled by an appropriate non-magnetic potting compound, such as epoxy, which may also be used as an exterior coating or shaping agent.

A transducer head structured generally in accordance with the foregoing provides the anomalous result of non-symmetric write/read width characteristics in a single-gap core and head. In the particular format generally referred to above, the write core (pole structure) 12 is configured, by its size and shape at the magnetic gap and the characteristics of the write coil winding 30, to write a track of magnetic transitions which are essentially as wide as the full length of the gap 16, i.e., the full width of core portion 12. On the other hand, the much narrower read core ("medial strata") 20 is configured, by its own size and shape, and by the characteristics of the read coil 28 wound upon its accessible intermediate portion 20b, to read a track width much narrower than the write core. Consequently, the overall head structure in the arrangement noted constitutes a head of single-gap configuration which writes a wide track but reads a narrow one.

Somewhat more particularly, it will be seen from the above that energization of the write coil 30 with electrical signals which it is desired to record will create corresponding magnetic flux patterns within the core structure 10, travelling around the paths so defined and across the transducing gap 16, at which position the width of the flux at the gap is actually a function of the height or width of the write core 12 and the overall height or width of all of the various strata (18, 20 and 22) constituting the opposite core half 14, i.e., essentially the same width as the write wire 12. As a result, a recorded track of the same width is written on the media moving across the gap.

Accordingly, in a write mode, the magnetic flux which moves across the gap from core 12 to core 14 is actually returned across the rear portion of the core (i.e., across the boundary 32) by all three of the strata 18, 20 and 22. In a read mode, however, the magnetic circuit performance is different due to the relative configuration of the read core 20 and the position of the read coil 28, which is wound upon only the medially-disposed read core element 20 and not on either of the outer strata 18 and 22 which flank the read core; consequently, members 18 and 22 function only as write closures. Thus, with the read core disposed in co-axial alignment with a written track on the media, the read core pole piece will be aligned over only the center portion of the written track on the media, and it will thus access considerably less than the full width of the magnetic transitions on the media. Accordingly, the magnetic flux flowing from the read core strata 20 to the rear boundary or junction 32 will be substantially less than the total available magnetic flux within the core itself, the write closures (i.e., the "peripheral" or "flanking" strata 18 and 22) serving in effect to shunt away from the read core a selected portion of the total magnetic flux which is not desired to be represented in the output (i.e., not desired to be "read"). Accordingly, a wide-write, narrow-read capability is provided, even though the head has but a single magnetic gap.

As indicated above, the selectively separate performance of the read core structure in relation to the write core structure of the disclosed apparatus is of primary importance in satisfying the desired objective. In large part, this consideration resolves itself down to the effective isolation of such two different core portions from one another, particularly during "read"-type transducing operation, at which time it is typical to encounter magnetic transitions on the recording media in proximity with the write closures ("flanking strata") 18 and 22 which are not desired to be reproduced in any manner. For example, such transitions may simply comprise "noise" of undetermined origin, or unerased previously-recorded data, "over-write", etc. Of course, since the read sense winding 28 is disposed about only the read core ("medial strata") 20, and not about the write closures 18 and 22, the effect of flux transitions encountered at the gap 16 by write closures 18 and 22 will not induce a corresponding sense voltage in the read winding 28; nonetheless, it will be evident that "cross talk" may result in a number of ways, which generally may be considered as "leakage" between the corresponding read and write portions of the core structure, mutual inductance, etc.

In point of fact, effective isolation between the write closures 18 and 22 and the read core 20, respectively, is essential in order to limit the effects of such "noise" to the greatest extent possible. This is particularly true where high-density digital recording is to be accomplished and, as is well known, there appears to be a constant and continuing desire for ever-greater recording densities in order to maximize data storage in relation to the physical size of the media. Whereas the isolation of these read and write core components has been largely overlooked by others heretofore, however, the aforementioned U.S. Pat. No. 4,085,429 provides for the use of isolating (non-magnetic) layers at the locations which have been identified; however, the entire thrust of this patent is that in order to be effective the thickness of such isolation layers in relation to recording gap width is a critical relationship, and this prior patent states a requirement for a very specific range of such thickness in terms of the recording gap width.

The present invention is based upon different and alternative concepts from those just noted, which have heretofore gone unrecognized.

Figure 3:
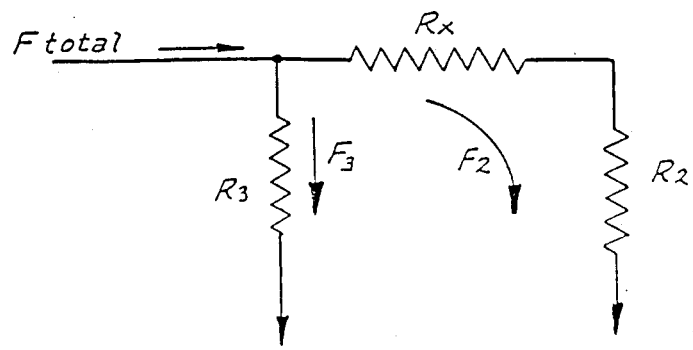
FIG. 3 schematic representation showing the equivalent magnetic circuit for the structure of FIGS. 1 and 2.

More particularly, with reference to FIG. 3, the simplified circuit shown in this figure represents the magnetic flux present in the magnetic circuit provided by the core structure 10. In this schematic, the label "$F_{total}$" designates total flux flow in the magnetic circuit, and is comprised of the two branches $F_2$ and $F_3$, which represent the flux flowing through the read core and through the write closure, respectively. In this figure, the magnetic reluctance of the corresponding core parts is represented as resistance elements, element $R_3$ being the reluctance of either of the two write closures 18 or 22, $R_x$ being the reluctance of either of the two isolation layers or 26, and $R_2$ designating the magnetic reluctance of the read closure 20 alone; thus, the effective reluctance of the read path is $(R_x + R_2)$ From the above, it will be seen that the degree of isolation in the disclosed multi-component core structure is a function of the magnetic reluctance of the write closures ($R_3$) in relation to that attributable to the read structure $(R_x + R_2)$ Thus, $$\frac{F_2}{F_{total}} = \frac{R_3}{R_3 + R_2 + R_x}$$

Of course, $$R_x = \frac{1}{0} \cdot \frac{1}{r} \cdot \frac{t}{A}$$

where
0 is the permeability of free air,
r is the permeability of the non-magnetic material used for the isolation layers,
t = the thickness of the isolation layers, and
A = the common area included between either of the write closures 18 and 22 and the read closure 20, i.e., the corresponding overlap between these elements.

In accordance with the above, it may be seen that it is very important to make $R_x$ large with respect to $R_3$. While this may be accomplished by making the thickness of the isolation layers large in relation to their effective area "A," this approach causes undesirable results because it produces a correspondingly wide, unrecorded "stripe" on the media during write operations, which typically will contain various un-erased data from previous operations. Consequently, in accordance with the present invention the desirable result of making $R_x$ large with respect to $R_3$ is achieved by making the common area A (see FIG. 1) small in relation to the thickness of the isolation layers 24 and 26, in particular of an order of magnitude sufficient to make the aforementioned flux ratio $F_2/F_{total}$ not more than about 5%, and in no event more than 10%. That is, the ultimate goal should be to restrict the common area A to a value permitting no more than about 10% leakage or cross-talk, and preferably no more than about 5%, between the magnetic flux flowing in the write closures 18 and 22 and the read closure 20 disposed therebetween. As indicated above, it is in fact essential to maintain such a relationship in order to achieve reliable and consistent substantially error-free high-density digital recording.

To further and more explicitly illustrate the foregoing, the width of a typical narrowed read core 20 in accordance with the invention may be on the order of half the total width of the write core 12 (for example five mils and ten mils, respectively) and if the thickness (t) of the isolation members 24 and 26 is approximately one-half mil each (as is in fact deemed appropriate in such a situation), the combined width of the two write closure members 18 and 22 will be four mils. (As will be understood, the two write closures will normally be of equal thickness, i.e., one-half of such combined width, although other and unequal relative proportions may be used where this is desired.) The amount of undesired noise resulting from flux transitions located beyond the edge extremities of the write closures 18 and 22 and in effect "read" by the latter during read operations is modified by these size ratios: thus, where the dimensions are as stated above, and where the maximum allowable flux leakage margin is selected to be not more than ten percent, $$\frac{F_2}{F_{total}} < .10 \cdot \frac{5}{2}$$

or, stated in terms of magnetic reluctance, $$\frac{F_2}{F_{total}} = \frac{R_3}{R_3 + R_2 + R_x} < .25$$

$$\text{thus } \frac{R_3}{.25} - R_3 - R_2 < R_x \text{ and}$$

$$3 R_3 - R_2 < R_x = (\text{where } k = 0 \, r)$$

therefore, it is desired that $$A < \frac{1}{3 R_3 - R_2} \cdot \frac{t}{k}$$

In a specific working example of the above, where
$R_3 = 6.9 \, 10^6$
$R_2 = 4.4 \, 10^6$
$o = 4 \, 10^7$
$r = 1$
$A < 961 \text{ mils}^2$ It is to be understood that the above is merely a description of a preferred embodiment of the invention and that various changes, alterations and variations may be made without departing from the underlying concepts and broader aspects of the invention as set forth in the appended claims, which are to be interpreted in accordance with the established principles of patent law, including the doctrine of equivalents.

The embodiments of the invention in which an exclusive property or privilege is claimed are defined as follows.

1. A magnetic core structure for a transducer head particularly adapted for use in digital data storage devices, comprising:

a magnetic circuit formed by magnetic core elements, said circuit having at least one gap defined by two opposing sides where magnetic flux in such circuit may access magnetically-recordable data storage media;

means forming a first magnetic pole structure for said circuit and defining one side of said gap, and means forming a second magnetic pole structure for said circuit and defining the other side of said gap, generally opposite said first pole structure;

at least said first magnetic pole structure having a laminar structure comprising at least one strata and at least one flanking strata, each comprising magnetic and having a predetermined magnetic reluctance;

said flanking strata being disposed in adjacent overlapping relationship with portions of said medial strata along said gap to thereby define an included area of overlap whose magnitude is determined by the length and width of that portion of the flanking strata overlying said medial strata at the gap, said medial strata having a thickness at said gap measured in a direction along said gap which is less than the thickness of said second pole structure disposed across said gap, to thereby access a narrower recorded band on said media than that accessed by said second pole structure;

isolation means comprising at least one layer of non-magnetic material disposed between said medial strata and said flanking strata at said included area of overlap, for magnetically separating at least said portions of said medial strata from the overlapping portions of the flanking strata;

said flanking strata serving to magnetically shunt portions of said magnetic circuit formed by said medial strata by extending alongside and into magnetic communication with said medial strata at a point along said magnetic circuit which is spaced from said first pole structure in the direction of said second pole structure, to thereby provide a parallel magnetic return;

said isolation means layer being thin in relation to said flanking strata and having a thickness less than one-half that of the adjacent flanking strata;

and said included area of overlap between said medial strata and said flanking strata at said first pole structure having a magnitude which makes the effective magnetic reluctance of said isolation means layer disposed therebetween sufficiently large with respect to the magnetic reluctance of said flanking strata that the transfer of magnetic flux from the flanking strata to the medial strata across the non-magnetic isolation means at said included area is limited to less than about ten percent of the total magnetic flux present in said magnetic circuit.

2. A magnetic core structure as defined in claim 1, wherein both of said pole structure at said gap have generally the same overall thickness or width measured in a direction along said gap.

3. A magnetic core structure as defined in claim 1, including at least a pair of said flanking strata, each disposed on an opposite side of said medial strata and having substantially the same thickness and overlying a selected area located between said flanking strata and said medial strata, said selected areas both being of substantially the same size to maintain said limited percentage of flux transfer.

4. A magnetic core structure as defined in claim 3, wherein both of said pole structures at said gap have generally the same overall thickness or width measured in a direction along said gap.

5. A magnetic core structure as defined in claim 1 wherein said included area of overlap between said medial strata and said flanking strata at said first pole structure has a magnitude which is determined in accordance with the ratio of the magnetic reluctance of said flanking strata with respect to the sum of magnetic reluctances of said flanking strata, said medial strata and said isolation means layer, such that the transfer of magnetic flux from the flanking strata to the medial strata across the non-magnetic isolation means at said area is limited to less than about ten percent of the total magnetic flux in said magnetic circuit.

6. A magnetic core structure as defined in claim 1 wherein said included area of overlap between said medial strata and said flanking strata at said first pole structure has a magnitude which is less than that determined in accordance with the expression $$A = \frac{1}{3R_3 - R_2} \cdot \frac{t}{k}$$

where:
$R_2$ is the magnetic reluctance of the medial strata;
$R_3$ is the magnetic reluctance of the flanking strata;
t is the thickness of the isolation means layer; and
k is the permeability of free air times the permeability of the isolation means layer.

7. A method of reading and writing magnetic flux transitions on magnetically-recordable media by using a single-gap transducer head in a manner producing results analogous to those achieved by multi-gap heads, comprising the steps:

transporting the recording media past a single-gap transducer head having a gap defined by two opposing sides establishing an overall gap length in a direction generally orthogonal to that of medial transport, and recording flux transitions on said media by using substantially all of the transducer magnetic core structure which defines an overall length of said gap;

transporting the recording media past said transducer head in a reproducing pass and, during said reproducing pass, reproducing the flux transitions previously recorded on said media by using a particular portion of said magnetic core structure constituting only a predetermined part of the overall length of said gap which is less than the overall length of said gap;

disposing non-magnetic means having a first reluctance between said particular portion of said magnetic core structure used in reproducing flux transitions and other adjacent portions which are located along said gap length, said other adjacent portions having a second reluctance and overlapping said particular portion when viewed along said gap length, said non-magnetic means serving to magnetically separate said particular portion of said magnetic core structure and said other adjacent portions during said reproducing pass; and restricting the size of the said adjacent portions in the area where they overlap said particular core portions in order to limit the amount of leakage flux transfer therebetween by making the said first reluctance so much greater than the said second reluctance that such leakage flux is restricted to a particular minor percentage of the total flux present in said core structure during reproduction of said recorded transitions even though said non-magnetic means is thinner than said other adjacent portions as viewed along the length of said gap.

8. The method of reading and writing magnetic flux transitions as recited in claim 7, wherein said step of restricting the size of said area of overlap comprises limiting said area to an extent which limits said leakage flux transfer to a value which is less than about ten percent of the total magnetic flux flowing in said magnetic core structure.

9. The method for reading and writing magnetic flux transitions as recited in claim 8, wherein said step of restricting the size of said area of overlap comprises making said area of overlap sufficiently small to limit said leakage flux transfer to a value not substantially exceeding five percent of the total magnetic flux flowing in said magnetic core structure.

* * * * *

UNITED STATES PATENT AND TRADEMARK OFFICE
CERTIFICATE OF CORRECTION

PATENT NO. : 4,954,921

DATED : September 4, 1990

INVENTOR(S) : Michael L. Bolt

It is certified that error appears in the above-identified patent and that said Letters Patent is hereby corrected as shown below:

Column 4, Line 9:

After "FIG. 3" insert --is a--;

Column 7, Line 41:

After "$(R_x+R_2)$" insert --.--;

Column 9, Line 20:

After "one" (first occurrence) insert --medial--;

Column 9, Line 22:

After "netic" insert --material--;

Column 9, Line 66:

"structure" should be --structures--.

Signed and Sealed this

Fourteenth Day of July, 1992

*Attest:*

DOUGLAS B. COMER

*Attesting Officer*    *Acting Commissioner of Patents and Trademarks*